US009124334B2

(12) United States Patent
Elenes et al.

(10) Patent No.: US 9,124,334 B2
(45) Date of Patent: Sep. 1, 2015

(54) DETECTING DIGITAL RADIO SIGNALS

(71) Applicant: Silicon Laboratories Inc., Austin, TX (US)

(72) Inventors: Javier Elenes, Austin, TX (US); Brian D. Green, Austin, TX (US); Michael R. May, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 14/283,648

(22) Filed: May 21, 2014

(65) Prior Publication Data

US 2014/0254729 A1 Sep. 11, 2014

Related U.S. Application Data

(62) Division of application No. 12/894,316, filed on Sep. 30, 2010, now Pat. No. 8,774,328.

(51) Int. Cl.
*H04L 27/06* (2006.01)
*H04B 1/08* (2006.01)
*H04H 20/30* (2008.01)
*H04H 60/12* (2008.01)
*H04L 27/00* (2006.01)
*H04W 52/02* (2009.01)
*H04L 25/03* (2006.01)

(52) U.S. Cl.
CPC ............... *H04B 1/086* (2013.01); *H04H 20/30* (2013.01); *H04H 60/12* (2013.01); *H04L 25/03834* (2013.01); *H04L 27/0008* (2013.01); *H04W 52/0229* (2013.01)

(58) Field of Classification Search
None
See application file for complete search history.

(56) References Cited

U.S. PATENT DOCUMENTS

| 5,838,742 | A | 11/1998 | Abu-Dayya |
| 7,339,503 | B1 | 3/2008 | Elenes |
| 7,555,065 | B1 | 6/2009 | Lou et al. |
| 8,351,534 | B2 | 1/2013 | Mussmann et al. |
| 2002/0045432 | A1 | 4/2002 | Yoshida |
| 2002/0172270 | A1 | 11/2002 | Whikehart et al. |
| 2008/0031369 | A1 | 2/2008 | Li et al. |

(Continued)

FOREIGN PATENT DOCUMENTS

CN 101743706 A 6/2010

OTHER PUBLICATIONS

State Intellectual Property Office P.R. China, Office Action mailed Oct. 24, 2013 in Chinese application No. 201110297470.5.
U.S. Patent and Trademark Office, Office Action mailed Nov. 28, 2012, with Reply filed Feb. 27, 2013 in U.S. Appl. No. 12/938,451.
U.S. Patent and Trademark Office, Requirement for Restriction/Election mailed Sep. 14, 2012, with Response filed Oct. 11, 2012 in U.S. Appl. No. 12/938,451.

(Continued)

*Primary Examiner* — Adolf Dsouza
(74) *Attorney, Agent, or Firm* — Trop, Pruner & Hu, P.C.

(57) ABSTRACT

In one embodiment, a receiver front end circuit can receive and process multiple radio frequency (RF) signals and output downconverted signals corresponding to these signals. In turn, multiple signal processors can be coupled to this front end. Specifically, a first signal processor can receive and process the downconverted signals to output a first signal obtained from content of a first RF signal, and a second signal processor can receive and process the downconverted signals to output a second signal obtained from content of a second RF signal. In addition, the apparatus may include a detection circuit coupled to the receiver front end circuit to detect presence of at least the second signal and enable the second signal processor responsive to the detected presence.

11 Claims, 8 Drawing Sheets

(56) References Cited

U.S. PATENT DOCUMENTS

| | | |
|---|---|---|
| 2008/0291857 A1 | 11/2008 | Arad et al. |
| 2008/0298515 A1* | 12/2008 | Peyla et al. .................. 375/343 |
| 2010/0165926 A1 | 7/2010 | Fukuoka et al. |
| 2011/0039492 A1* | 2/2011 | Johnson et al. ............. 455/3.05 |
| 2011/0243209 A1 | 10/2011 | Oren et al. |
| 2011/0310948 A1 | 12/2011 | Ramesh et al. |
| 2012/0028567 A1 | 2/2012 | Marko |

OTHER PUBLICATIONS

U.S. Appl. No. 12/938,451, filed Nov. 3, 2010, entitled "Controlling Power Consumption in a Radio Tuner," by Matthew Henson, et al.

Ibiquity Digital, "HD Radio, How it Works," copyright date 2011 (actual publication date unknown), 2 pages.

State Intellectual Property Office P.R. China, Office Action mailed May 6, 2014 in Chinese application No. 201110297470.5.

\* cited by examiner

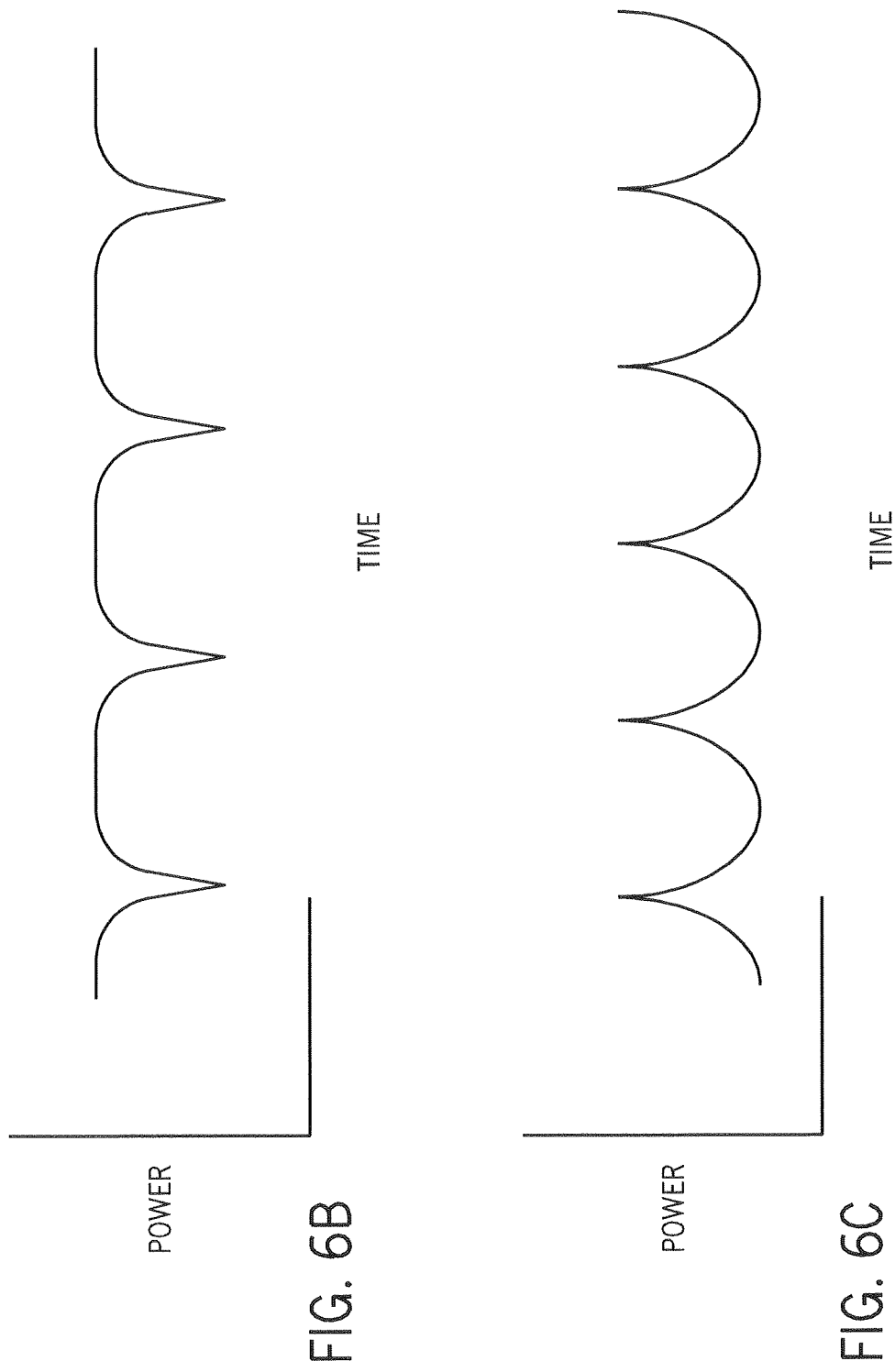

US 9,124,334 B2

DETECTING DIGITAL RADIO SIGNALS

This application is a divisional of U.S. patent application Ser. No. 12/894,316, filed Sep. 30, 2010, the content of which is hereby incorporated by reference.

BACKGROUND

Digital radios have been introduced to enable reception of a new digital radio spectrum that provides improved fidelity, as well as additional features. Currently in the United States, digital radio is available over-the-air using sidebands to an analog carrier signal. The current system as commercialized in the United States is referred to as so-called HD™ radio. By way of these sidebands, a broadcaster can provide one or more additional complementary channels to an analog carrier signal.

Accordingly, digital or HD™ radios can receive these signals and digitally demodulate them to provide a higher quality audio signal that includes the same content as an analog radio signal, or to provide additional content to the analog radio signal such as supplementary broadcasting available on one or more supplemental digital channels.

Typically, a digital radio tuner is incorporated in a radio solution that also includes a conventional analog spectrum receiver for handling demodulation of the analog carrier signal. In a digital radio for use in a home or automobile environment, demodulation for both the analog and digital signals can run concurrently, as power consumption is not a concern. However, in a portable device, excessive power consumption by the digital demodulator can adversely affect battery life, particularly as a digital signal may not always be available.

SUMMARY OF THE INVENTION

According to one aspect, the present invention is directed to an apparatus having a receiver front end circuit to receive and process multiple radio frequency (RF) signals and to output downconverted signals corresponding to these signals, a first signal processor coupled to the receiver front end circuit to receive and process the downconverted signals to output a first signal obtained from content of a first RF signal, and a second signal processor coupled to the receiver front end circuit to receive and process the downconverted signals to output a second signal obtained from content of a second RF signal. In addition, the apparatus may include a detection circuit coupled to the receiver front end circuit to detect presence of at least the second signal and to enable the second signal processor responsive to the detected presence. In some embodiments, the detection circuit may cause a reconfiguration of the receiver front end circuit responsive to the detection. In one embodiment, the apparatus is a single radio tuner included on a single semiconductor die and which may include a narrowband receiver.

Yet another aspect is directed to an apparatus that includes a filter to receive a band limited signal downconverted from a radio signal and to filter the band limited signal according to a pulse shaping function used to encode the radio signal. The apparatus can further include a peak detector to detect peaks within the filter output and a controller to detect presence of a valid signal within the radio signal based at least in part on the detected peaks. In one example embodiment, the apparatus can be implemented in a digital signal processor (DSP) of a radio receiver, and based on the detected presence, the DSP can enable a digital radio demodulator coupled to the DSP to perform digital demodulation on the signal.

A still further aspect is directed to a method that includes applying an incoming band limited signal to a filter matched to a pulse shaping function, detecting one or more peaks in the filter output occurring during a sampling window, and determining presence of a valid digital signal in the radio signal based at least in part on the one or more detected peaks. This detection method may be used to detect the presence while a demodulator used to demodulate the digital signal is powered down.

A still further aspect is directed to a system having an analog front end to receive and downconvert a RF signal to a second frequency signal, and a DSP coupled to the analog front end to receive the second frequency signal and determine whether a valid channel is present in the RF signal while a demodulator is powered down. In turn, the demodulator can receive and demodulate the second frequency signal, where the demodulator is enabled responsive to the determination in the DSP of presence of the valid channel.

BRIEF DESCRIPTION OF THE DRAWINGS

FIG. 6B is a graphical illustration of a power level of a matched filter output that represents a power envelope of a received digital radio signal.

FIG. 6C is a graphical illustration of a power level of a different matched filter output that represents a power envelope of a received digital radio signal.

DETAILED DESCRIPTION

In various embodiments, a radio tuner can be configured to receive multiple incoming radio frequency (RF) signals. That is, a single tuner, which may have a single downconverter such as a mixer, can in some instances simultaneously receive and process multiple RF signals. As one example, these RF signals may be analog and digitally encoded signals. To this end, a receiver may include multiple signal processing paths, each including circuitry to process at least one type of downconverted signal obtained from a receiver front end. Furthermore, to provide for improved performance while maintaining reduced power consumption, one or more of these signal paths can be controlled to be enabled/disabled based on detection of a corresponding signal to be processed in that path. Thus a signal detector such as a power envelope detector or other such detector may be used to detect the presence of a valid signal within a received RF spectrum and to enable operation of a corresponding signal processor, as well as to potentially control configuration of the receiver front end.

Figure 1A:
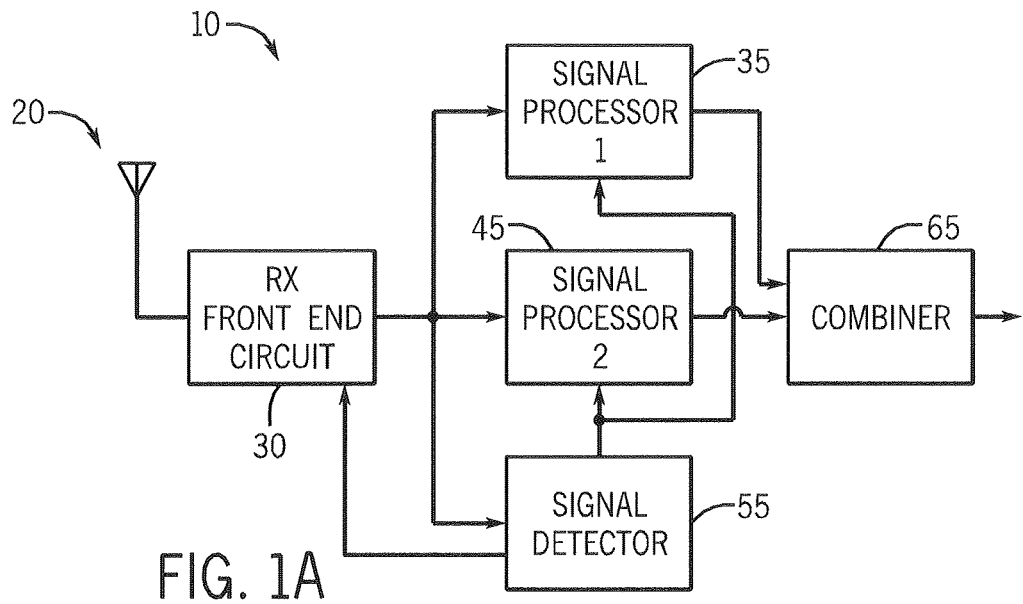
FIG. 1A is a block diagram of a radio receiver in accordance with an embodiment of the present invention.

Referring now to FIG. 1A, shown as a block diagram of a system in accordance with one embodiment of the present invention. As shown in FIG. 1A, system 10 may be a radio receiver that is part of an audio system. Such system may take various forms, including home systems, portable systems, automobile systems and so forth.

As seen in the embodiment of FIG. 1A, system 10 can include an antenna 20 that is coupled to a front end circuit 30. Antenna 20 may be configured to receive various types of incoming RF signals including, for example, conventional broadcast signals such as AM and/or FM broadcast signals, sidebands to such signals that may include the same or different content, e.g., modulated according to a digital modulation scheme, other terrestrial signals, satellite signals, or so forth. As one specific example, a first RF signal may correspond to an analog signal of a conventional broadcast radio station and the second RF signal may correspond to a digital signal of that same radio broadcast. However, these two RF signals, which are in a relatively close bandwidth with respect to each other, may include substantially the same content or information, but modulated according to different modulation schemes (e.g., the analog signal modulated according to an FM scheme, while the digital signal is modulated according to, e.g., an orthogonal frequency division multiplexing (OFDM) scheme).

Front end circuit 30 may include a single mixer in some embodiments, to downconvert the incoming RF signals to a lower frequency. While the scope of the present invention is not limited in this regard, the downconversion may be to an intermediate frequency (IF) signal, a low-IF signal, or baseband signals, depending on a desired implementation. Front end circuit 30 may include further components such as gain control units, filters and so forth to thus process the incoming signals into a form to be handled by the downstream circuitry. As further shown in FIG. 1A, RF front end circuit 30 may be coupled to multiple signal processing circuits. In many embodiments the receiver may be configured as a narrow band receiver.

In the embodiment shown in FIG. 1A, two such signal processors are shown, namely a first signal processing circuit 35 and a second signal processing circuit 45. However, understand the scope of the present invention is not limited in this regard and in other implementations additional processing paths may be present. In some implementations, the signals output by RF front end circuit 30 may be digitized signals corresponding to band limited signals. By band limited, it is meant that these signals have been processed to realize a signal that is of narrower bandwidth than an incoming signal. For example, the band limited signals may be filtered in one more filters of the receiver front end to provide a band limited signal. In some embodiments, the band limited signals may have a bandwidth of less than approximately 20 percent of a center frequency of the received RF signal. The band limited signals may be processed in the corresponding signal processing circuits to thus obtain a channel signal, which may correspond to a demodulated audio signal, in some embodiments.

As further seen in FIG. 1A, RF front end circuit 30 further provides its output to a signal detector circuit 55. The signal detector circuit 55 may be configured to detect presence of valid signals within the received RF spectrum. More specifically, signal detector 55 may be configured to detect presence of one or more types of incoming signals, e.g., the first or second signals processed in the corresponding signal processors. Although scope of present invention is not limited in this regard, in some implementations signal detector 55 may be configured as a power envelope detector, although other implementations are possible such as rms detector, cross correlation with a known sequence or an autocorrelation function.

Because in some instances the multiple desired signals may not be present in a given area in which the tuner is operating, signal detector 55 may cause enabling of, e.g., second signal processor 45 only when a valid signal to be processed in that processor is detected. Otherwise, signal processor 45 may be disabled to reduce power consumption. Similar control may be provided to first signal processing circuit 35. Furthermore, based on the type of the detected signals in signal detector 55, various control signals may be provided both to front end circuit 30 as well as the signal processors to configure them for operation based on the type of signals detected.

In many implementations at least some of the signals processed in the first and second signal processors can be of substantially the same content, e.g., analog and digital versions of a radio broadcast signal. Accordingly, as at least the digital signal may be valid or invalid at certain times, a combiner 65 may be provided to combine the outputs of the two signal processors. However understand that the operations performed in combiner 65 can simply be the passing of one or the other of the signals, or a linear combining of the two as a valid, e.g., digital, radio signal is detected or lost to provide for smooth transitions between the digital and the analog signal outputs. Although shown with this particular implementation in the embodiment of FIG. 1A, understand the scope of the present invention is not limited in this regard.

For example, embodiments may be used to provide efficient detection of the presence of a digital radio signal, without the need for powering a demodulator that performs demodulation of the digital radio signal. As used herein, the terms "digital radio" and "HD™ radio" are used interchangeably and are intended to correspond to radio communication that occurs digitally, e.g., as one or more sideband channels to a main analog signal channel. Such communications may be in accordance with various standards such as a National Radio System Committee (NRSC-5C), Digital Audio Broadcasting, Digital Radio Mondiale or other standard. This digital communication is also known as in-band on-channel (IBOC) broadcasting. Using an embodiment according to the present invention, significant power reductions can be realized, and which may be particularly suitable for a system operating on battery power, e.g., a portable device. Still further, by performing HD™ radio detection in accordance with an embodiment of the present invention, the detection time may be significantly lower than a corresponding detection time as performed by the HD™ demodulator itself.

As discussed above, HD™ content can be provided as sidebands to an analog carrier signal. In current digital radio systems, the sidebands may include a plurality of subcarriers that are modulated according to an orthogonal frequency division multiplexing (OFDM) scheme in which one or more channels of digital content can be provided in sidebands adjacent to and on both sides of an analog radio signal.

Currently, many broadcasters transmit a bundled signal including both analog and digital information. The analog information is a conventional radio channel and may have a single sided bandwidth of approximately 100 kilohertz (kHz), centered around a carrier frequency at a midpoint of a channel spectrum that is approximately 200 kHz wide. In addition, one or more digital channels can be encoded into sidebands to this main signal channel. Because this information is in digital form various other information in addition to audio information, such as textual data, e.g., song titles, station information, news and so forth can be present. Also, the digital radio channels may have higher quality sound than the analog channel.

Due to the presence of both analog and digital channels that may include the same information, many receivers support a so-called hybrid mode in which existing analog reception can be augmented when a corresponding digital channel is available. In addition to one digital channel that is a simulcast of the analog channel, some broadcasters provide one or more additional digital channels or subchannels of a complementary nature, such as an all music, talk, news, sports or other broadcasts. Thus multiple digital channels can be present in the sidebands. Further, it is possible that some broadcasters will offer a fully digital transmission in which an entire radio channel is devoted to digital information, such that enhanced services such as increased data capacity, surround sound or other multicasting solutions can be made available across this bandwidth that might otherwise be used for an analog channel. Embodiments may provide for detection of valid digital signals in any of these different environments.

Figure 1B:
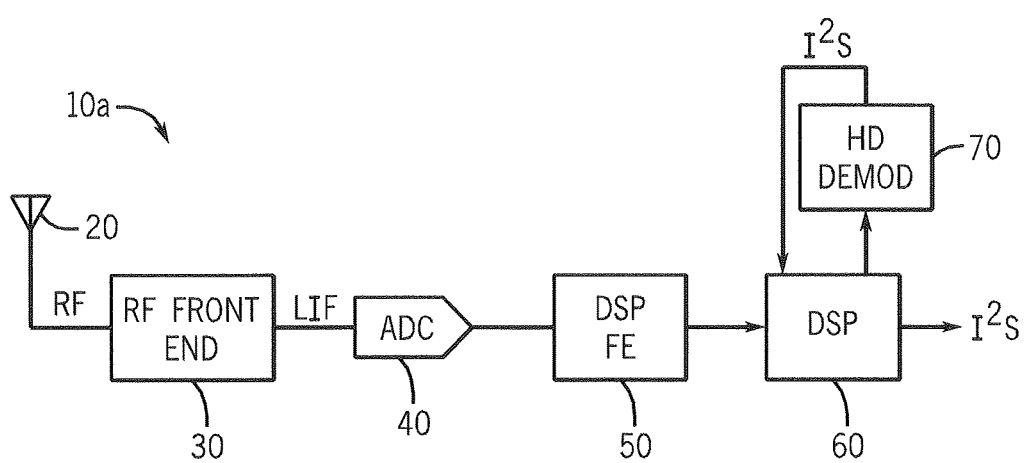
FIG. 1B is a block diagram of a radio receiver in accordance with another embodiment of the present invention.

Referring now to FIG. 1B, shown as a block diagram of a radio receiver in accordance with another embodiment of the present invention. As shown in FIG. 1B, radio receiver 10a may be integrated on a single semiconductor die, for example, according to a complementary metal oxide semiconductor (CMOS) process. This mixed signal receiver includes both an analog front end as well as a digital portion that can perform much of the signal processing digitally, reducing area and power consumption and greatly aiding in programmability, as well as providing for additional features.

As seen in FIG. 1B, receiver 10a may be coupled to an antenna 20 that receives an incoming radio frequency (RF) signal and provides the signal to an RF front end 30. As will be discussed further below, in exemplary embodiments various circuitry including amplifiers, mixers, filters and so forth may be present within the RF front end. In the embodiment shown in FIG. 1B, RF front end 30 may have a low-intermediate frequency (IF) architecture in which the output from the RF front end is at a low intermediate frequency.

As further seen in FIG. 1B, the low-IF signals are provided to an analog-to-digital converter (ADC) 40, which in one embodiment may be a one-bit delta-sigma converter, although the scope of the present invention is not limited in this regard. ADC 40 may operate at very high speeds to provide a digitized output. Note that while shown with these limited components in the embodiment of FIG. 1B, understand that an analog front end of a receiver may include additional circuitry.

As seen further in FIG. 1B, the digitized signals from ADC 40 may be provided to a digital signal processor (DSP) front end 50, which may perform various digital processing on the incoming digitized signals. For example, DSP front end 50 may perform channelization, e.g., via a CIC decimator. In some embodiments, other processing may be performed in this DSP front end such as image cancellation and so forth.

Still further, understand that the decimation and/or filtering performed in DSP front end 50 may vary in different embodiments. As one example, DSP front end 50 may output band limited complex signals, i.e., so-called in-phase (I) and quadrature (Q) signals, although in other embodiments the band limited signals need not be of complex character.

Furthermore, since processing may occur both for an analog signal as well as for digital signals present in sidebands to the analog channel, the band limited signals may be provided to a DSP 60 at various sampling rates. For example, the band limited signals may be decimated to a relatively slow speed (e.g., 400 kilosamples per second (kS/s)) for analog processing purposes, while for processing of the digital information present in the sidebands, the decimation may result in a relatively high speed signal transfer (e.g., 3 megasamples per second (MS/s)).

Note that while DSP front end 50 and DSP 60 are shown as separate blocks in the embodiment of FIG. 1B, understand that in many actual implementations, both blocks may be present, along with all other blocks shown in FIG. 1B, on a single semiconductor die, and are shown as separate blocks in FIG. 1B for ease of discussion.

As will be described further below, various processing may be performed in DSP 60, both on the analog signal information as well as the digital signal information. Specifically, the analog signal information may be demodulated in a demodulator portion of DSP 60, which digitally demodulates the incoming band limited signals corresponding to the analog signal channel. Understand that while this is a digital demodulation, the band limited signals that are demodulated are of an analog character; this is in contrast to the digital demodulation performed on digital radio signals, as the original transmitted signal information was of a digital source. The demodulated signals corresponding to the analog radio channel may be provided to a blending circuit of DSP 60 where, as discussed further below, the demodulated analog signal can be blended with a corresponding demodulated HD™ signal. As will be discussed further, DSP 60 may perform various signal processing on the digital signal information, including various filtering as well as processing to perform a detection as to whether a valid HD™ signal is present.

As seen further in FIG. 1B, the processed digital signal information can be provided to an HD™ demodulator 70, which may perform digital demodulation of this digital information. In some embodiments, HD™ demodulator 70 may be a licensed block of a third party. Note that in various embodiments, a large percentage of an entire chip area and power consumption may be as a result of this HD™ demodulation. Accordingly, embodiments may use circuitry within DSP 60 to perform HD™ detection to avoid the need to provide or maintain power to HD™ demodulator 70 in the absence of detection of valid digital channel information.

As further shown in FIG. 1B, HD™ demodulator 70 may output a HD™ demodulated signal, e.g., according to an I²S protocol. As seen, this signal is fed back to DSP 60, where it may also be provided to the blending circuitry discussed above for blending with the corresponding analog signal. That is, where the selected digital channel is the same as the selected the analog channel, blending may occur to resolve situations in which the digital channel is temporarily lost. After blending and any other processing such as sample rate conversion, a digital audio signal representing the selected channel is output from DSP 60, e.g., again according to an I²S protocol. Here the digital audio may be provided to various destinations such as an audio processor, which may be of a separate semiconductor die, in some embodiments. While shown with this particular implementation in the embodiment of FIG. 1B, understand the scope of the present invention is not limited in this regard.

Figure 2:
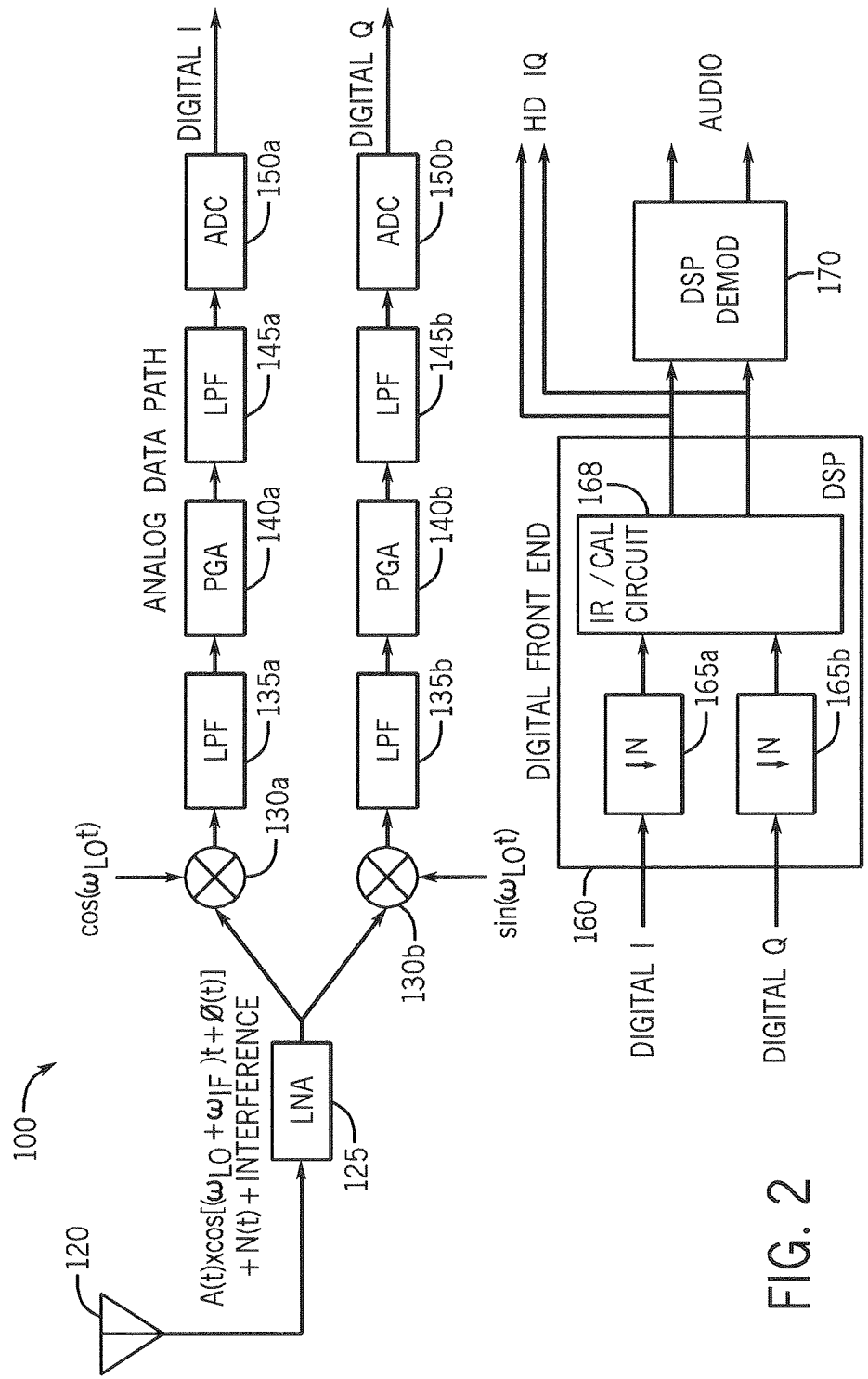
FIG. 2 is a block diagram of further details of a receiver in accordance with an embodiment of the present invention.

Embodiments may be implemented in many different types of systems. For example, HD™ detection can be incorporated into various types of radios such as a standalone AM/FM receiver, or a multi-band receiver, such as an FM/AM/WB receiver. Referring now to FIG. 2, shown is a block diagram of a receiver in accordance with an embodiment of the present invention that shows some details of the analog front end section. As shown in FIG. 2, receiver 100 may be of a low-IF receiver architecture. In the embodiment of FIG. 2, receiver 100 is coupled to receive an RF signal via an antenna 120 that in turn is coupled to a low noise amplifier (LNA) 125. In turn, the RF signal may be provided to mixers $130_a$ and $130_b$. As seen in FIG. 1B, the receiver may have a complex signal architecture having separate IQ phases, such that separate paths for I and Q-phases are provided. This is realized by mixers 130, each of which mix the received RF signal with a local oscillator (LO) frequency at different phases, namely 90° apart. In the embodiment of FIG. 2, mixers 130 may mix the incoming signal with a local oscillator frequency to generate an IF signal.

Various analog processing may then be performed on the IF signals. Specifically, each of the I and Q paths may include a first low pass filter (LPF) 135, a programmable gain amplifier (PGA) 140 and a second LPF 145. As will be discussed below, the bandwidth of these filters may be selected based on whether a valid HD™ signal has been detected. For example, in the absence of HD™ signals, a relatively narrow bandwidth, e.g., of approximately 200 kHz (for FM operations) may be set, while when a valid HD™ signal is detected, the bandwidth may be wider (e.g., approximately 400-500 kHz). As such, greater power consumption occurs even in the analog front end for HD™ operation. The resulting signal is then provided to an ADC 150, which converts the analog IF signals to digital I and Q signals, which may then be provided to a digital portion of the receiver. Note that while in many implementations receiver 100 may be configured as a single integrated circuit, e.g., a CMOS device configured on a single semiconductor die, the scope of the present invention is not limited in this regard.

The digital information may be provided to a digital portion of the receiver which may include a digital front end 160 that may perform various digital processing to prepare the signals for demodulation in a DSP 170, which may thus demodulate the signals and provide demodulated data to a desired location. As seen in FIG. 2, digital front end 160 may include programmable decimators 165 to control a sampling rate of the digital signals. Note that the programmable decimation ratio N can be controlled to handle various sampling rates, e.g., HD™ (744 kilosamples per second (KS/s)), FM (372 KS/s), WBRX (93 KS/s), AM (46 KS/s).

While shown as a single structure, understand that in some implementations a portion of such decimation may be performed in fixed digital hardware, while additional decimation may be performed using programmable logic. In addition, in the embodiment shown in FIG. 2 front end 160 may further include an image rejection/calibration circuit 168 to handle image rejection processing and to generate samples at a desired rate, and to thereafter provide digital samples to DSP 170. While shown with this particular implementation in the embodiment of FIG. 2, the scope of the present invention is not limited in this regard.

Figure 3:
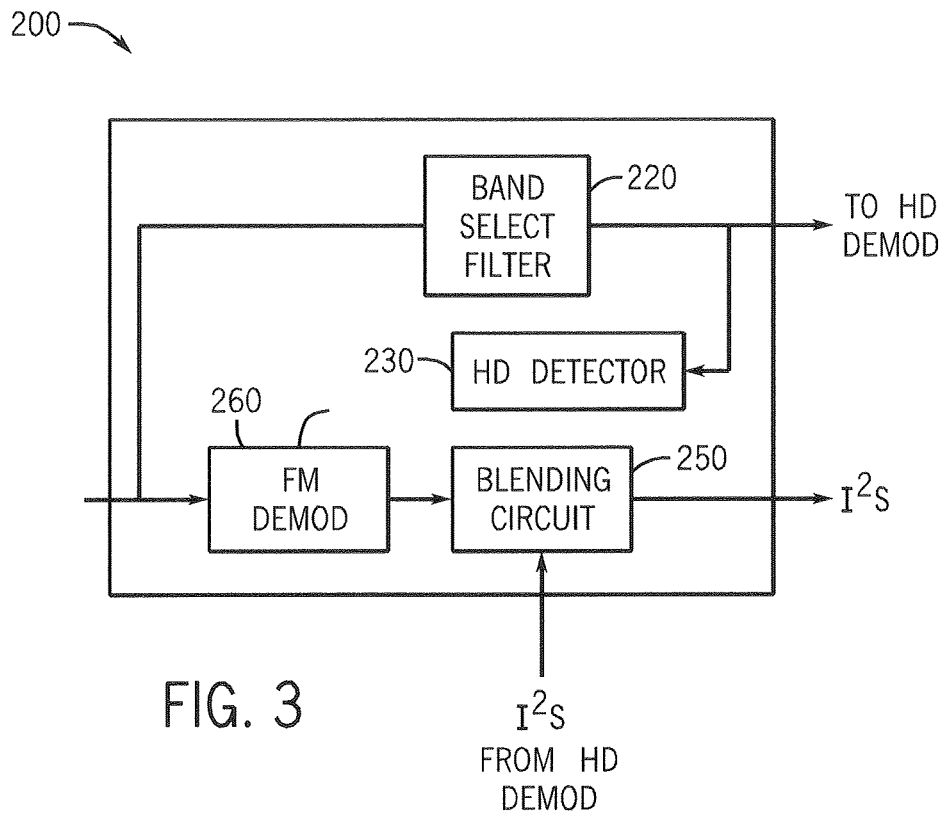
FIG. 3 is a block diagram of a portion of a digital signal processor (DSP) in accordance with an embodiment of the present invention.

Referring now to FIG. 3, shown is a block diagram of a portion of a DSP in accordance with an embodiment of the present invention. As shown in FIG. 3, DSP 200 may correspond to the portion of the DSP shown at block 60 in FIG. 1B. As first seen in FIG. 3, incoming band limited signals are provided to the DSP portion. While these signals may be provided at multiple sample rates, e.g., a low speed sample rate and a high speed sample rate, for ease of discussion only a single path is discussed. As seen, the incoming signals can be provided to an analog processing path of the DSP. Note that while the terminology "analog" is used herein, understand that at this point of the signal processing path these signals are in digital form, and as used herein the term "analog path" is simply used to indicate that the processing path is for information present in the analog signal channel, i.e., the main signal channel.

Still with reference to FIG. 3, an analog FM demodulator 240 may be provided to perform demodulation of the conventional analog FM signal. The resulting demodulated signal (which is in digital audio form), may be provided to a blending circuit 250, discussed further below. Understand also that while the implementations described herein are for FM radio, embodiments are equally applicable to other radio bands, e.g., AM, WB or so forth.

Note also that the incoming signals may be provided to a band select filter 220. In general, band select filter 220 acts to filter out the analog signal channel information, leaving only the desired sideband information. The filtered output may be provided to the HD™ demodulator for demodulation of this digital information. Furthermore, the filtered signal is provided to an HD™ detector 230. As discussed above, this detector may operate within the DSP, providing efficiency in power consumption as well as efficiency in speed of detection. The DSP may include or be associated with, in some embodiments, an article in the form of a computer-readable medium onto which instructions are written. These instructions may enable the DSP or other programmable processor to perform digital radio detection and other processing as described herein.

With reference to blending circuit 250, in addition to receiving the conventional demodulated analog signal, it further receives the demodulated HD™ signal. Blending circuit 250 may be controlled to pass the HD™ audio signal when it is available and when not available, to pass the analog audio signal. Furthermore, during a transition between the two domains, blending circuit 250 acts to blend the two signals to provide for a smooth transition between the two domains, enabling continuous radio reception so that the transition between the two domains is unnoticed by a user. While shown with this particular implementation in the embodiment of FIG. 3, understand the scope of the present invention is not limited in this regard.

Figure 4:
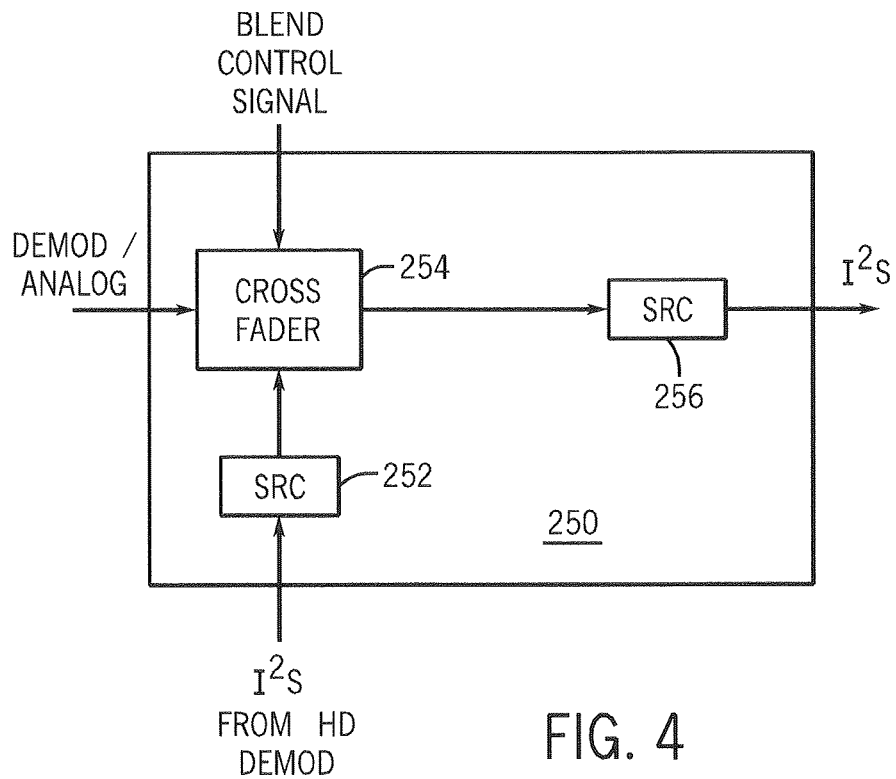
FIG. 4 is a block diagram of a blending circuit in accordance with an embodiment of the present invention.

Referring now to FIG. 4, shown is a block diagram that further details a blending circuit in accordance with an embodiment of the present invention. As shown in FIG. 4, blending circuit 250 includes a cross-fader 254 that receives the demodulated analog signal as well as the demodulated HD™ signal. Note that the HD™ signal may pass through a sample rate converter 252 prior to being provided to cross-fader 254.

In various embodiments, a blending control signal, which may be received from the HD™ demodulator, controls a selection as to which signal is passed, as well to implement blending during a transition. In various embodiments, this blending control signal itself may be digital, with a logic low level meaning that an analog signal is to be passed, while when it is logic high, the HD™ signal is to be passed. Further, on a transition between low to high or vice versa, cross-fader 254 may act to blend the two signals, e.g., according to a linear function. The output of the cross-fader 254 may be provided to another sampling rate circuit 256, which can resample the digitized signal to a desired rate, e.g., a rate of a downstream audio processor. As seen, this output may be communicated via an I²S link to such an audio processor or other location. While shown with this particular implementation in the embodiment of FIG. 4, understand that the scope of the present invention is not limited in this regard.

Figure 5:
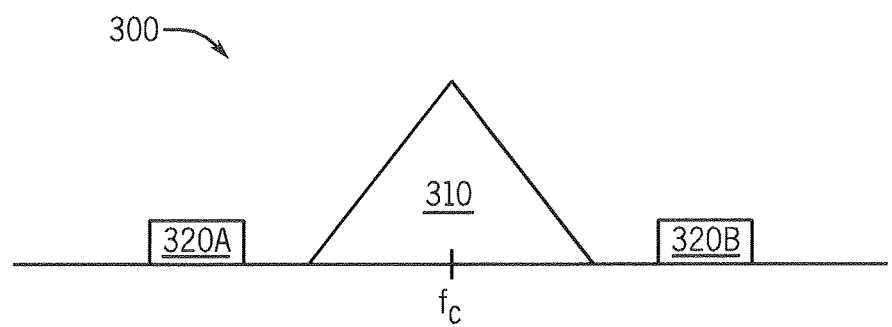
FIG. 5 shows a portion of a radio spectrum including digital content.

To aid in understanding how detection of an HD™ signal occurs in various embodiments, it is instructive to examine the radio spectrum with regard to an HD™ signal. Referring now to FIG. 5, shown is a portion of a radio spectrum including HD™ content. As seen in FIG. 5, a radio signal 300 includes an analog signal channel 310 which is centered at a carrier frequency $f_c$. In the context of the FM band, the channel center may be at a frequency of a given radio station, e.g., 93.3 MHz. Immediately adjacent analog signal channel 310 and separated by a guard band (which may be 30 kHz) are a pair of sidebands 320A and 320B. Each of the sidebands may be modulated according to an OFDM scheme, rather than a FM (or other) modulation used to modulate the main analog signal channel 310.

The sidebands each may be approximately 70-100 kHz wide, thus extending the total bandwidth for the combined analog and digital channel to approximately 400 kHz. Within the sidebands a plurality of individual subcarriers may be present. Note however that these OFDM sidebands are at much lower power than the main signal channel. Typically, these sidebands may be at a power level of approximately −23 dBc below the main signal channel. To provide for valid HD™ reception, a channel-to-noise ratio (CNR) for the digital channel of approximately 3 dB should be present. If not, it may be difficult to provide for HD™ reception, processing and output. Using a detector in accordance with an embodiment of the present invention, the presence of the HD™ signal can be detected without the need to run or power up an HD™ demodulator.

As just discussed, for HD™ radio communication, OFDM symbols are used. These symbols are weighted in the time domain by a pulse shaping function. In general, a broadcaster operates a transmitter that takes an incoming digital stream and modulates it, e.g., according to a quadrature phase shift keying (QPSK) modulation scheme using an inverse fast fourier transform (IFFT), such that a plurality of individual subcarriers are aggregated to form one OFDM symbol.

Figure 6A:
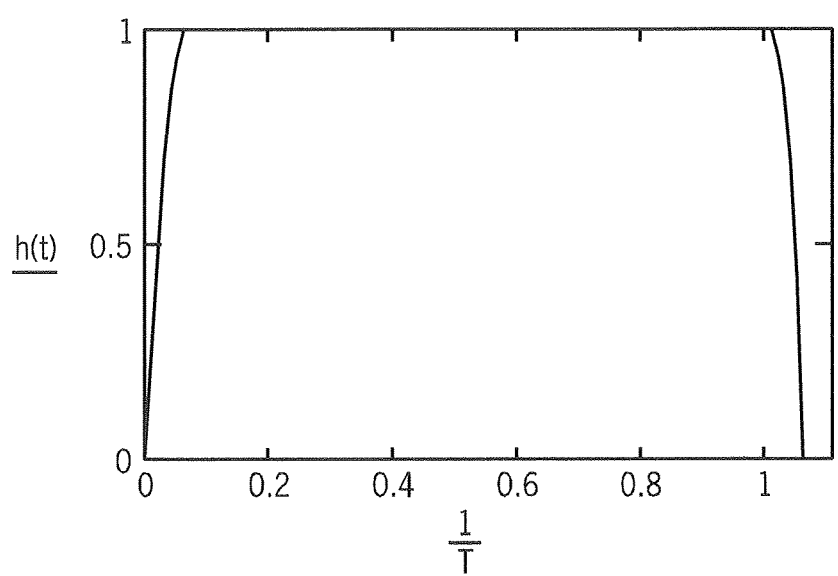
FIG. 6A is a graphical illustration of a pulse shaping function used by a transmitter to generate a digital radio signal for transmission.

Referring now to FIG. 6A, shown is a graphical illustration of a pulse shaping function used by a transmitter to generate OFDM symbols for transmission, e.g., via a radio broadcast. As seen, after a relatively sharp rise, the signal remains at a non-zero constant value until an end of the period, at which point it drops relatively sharply back to a zero value. The power envelope of the OFDM signal is thus shaped by a function H(t) and it may pulse at a symbol period Ts. In one embodiment the function H(t) is as follows:

$$h(t) = \cos\left[\pi \frac{\alpha T - t}{2\alpha T}\right] \text{ if } 0 < t < \alpha T$$
$$1 \text{ if } \alpha T \leq t \leq T$$
$$\cos\left[\pi \frac{\alpha \cdot T - t}{2\alpha T}\right] \text{ if } T < t < T(1 + \alpha)$$
$$0 \text{ otherwise}$$

where T corresponds to the reciprocal of the OFDM subcarrier spacing, e.g., 2048/744187.5 or 0.00275) and α represents a cyclic prefix width of a prefix appended to a front of the symbol (e.g., 7/128 or 0.0547).

This symbol period may correspond to approximately 2.902 milliseconds or (1+α)T. Embodiments may detect an HD™ signal based on the periodicity of the power envelope of the incoming signal. HD™ detection in accordance with an embodiment of the present invention may be performed using channelized HD™ band limited signals. For example, with reference back to FIG. 2, the output of HPF 220 may correspond to these channelized HD™ band limited digital signals.

Further, while the scope of the present invention is not limited in this regard, the signals may be provided to the detector at a rate of 744.1875 kHz.

In general, the detection method may operate by finding symbol edges using an approximation to a filter matched to the pulse shaping function. As a result, the output of the filter may have peaks that correspond to the symbol edges. Referring now to FIG. 6B, shown is a graphical illustration of a power envelope for the downconverted and filtered band limited signal. As seen in this example, with a valid digital signal, notches in the power envelope appear with a periodicity corresponding to the OFDM symbol period, approximately 2.902 ms. Understand that while shown with negative-going peaks, depending on the filter implementation, peaks may be of a positive-going direction, as shown in FIG. 6C.

For a number of incoming OFDM symbols (e.g. N symbols), a peak search may be performed on the filter output to determine the number and location of peaks that exceed a predetermined threshold level. Specifically, for each such peak detected, an index value may be stored, e.g., corresponding to a time index value. After the N samples have been so processed, a sequence of the peak index values may be differentiated to thus obtain information regarding pulse periods. Namely, each two adjacent peaks may be differentiated to determine the time difference between these two peaks.

For each such pulse period, it may then be determined whether the period is substantially around the OFDM symbol period (e.g., the 2.902 ms value discussed above). A count of such pulse periods may be maintained and if the resulting count for all the pulse periods of the N symbols is greater than a threshold count value, a HD™ signal is thus validly detected. Based on this valid detection, various operations may be performed. First, a control signal may be sent to the HD™ demodulator to enable it for performing demodulation. Such signal thus may cause the HD™ demodulator to power up and perform any initialization necessary before it begins performing demodulation. Additionally, a control signal may be sent to update the filter bandwidth of one or more filters in the analog front end to enable wider band operation to accommodate the digital channels. Note that in other embodiments this re-configuration may be performed before the detection process begins. Furthermore, upon the valid detection, information may be sent to enable update to the blending control signal, discussed above. Still further, assume an implementation in which a digital-capable radio has a display that indicates presence of a valid HD™ channel. Accordingly, this HD™ detection may also cause display of an HD™ indicator.

Figure 7:
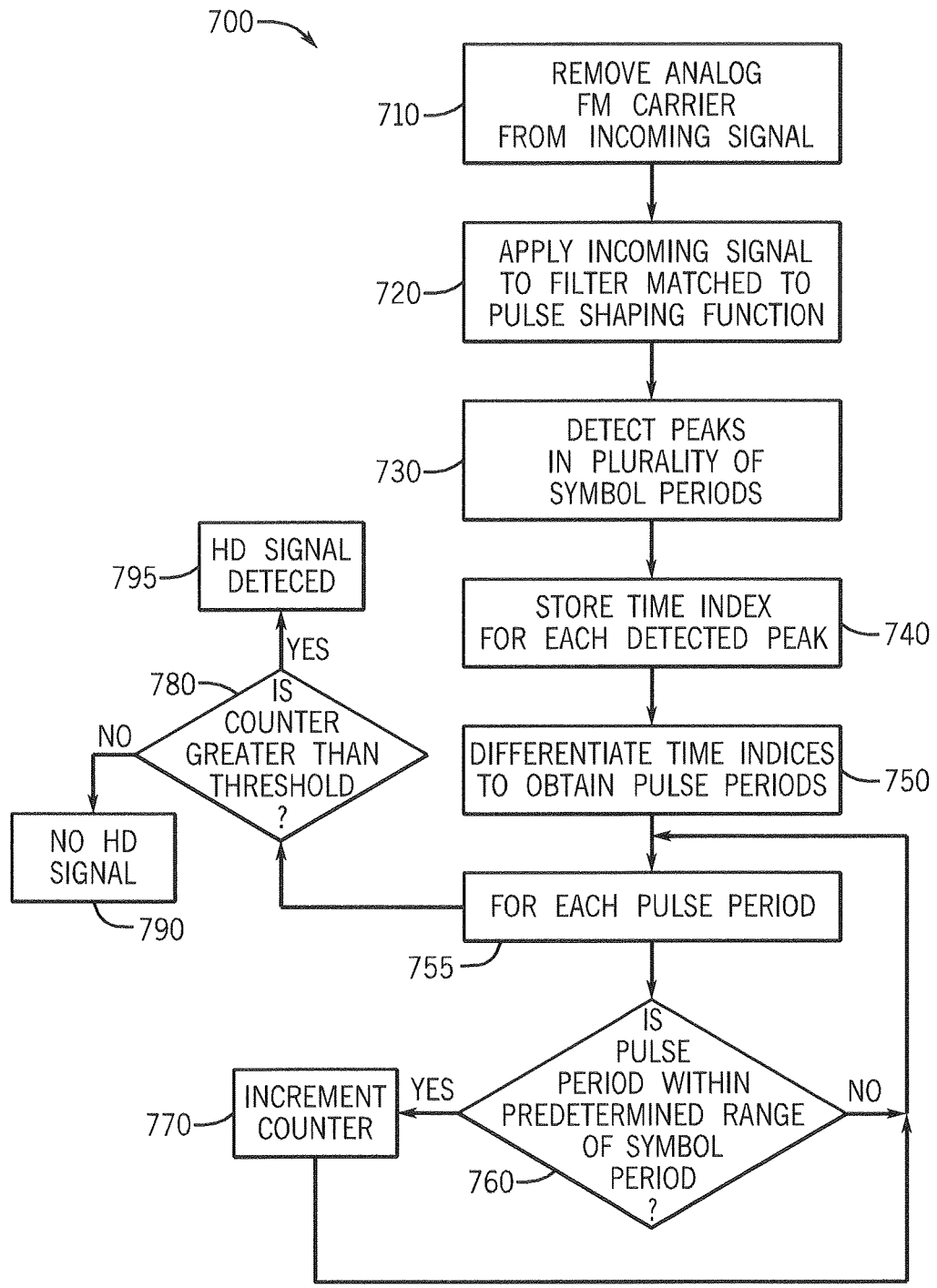
FIG. 7 is a flow diagram of a method for detecting a digital radio signal in accordance with an embodiment of the present invention.

Referring now to FIG. 7, shown is a flow diagram of a method for detecting a digital radio channel in accordance with an embodiment of the present invention. As shown in FIG. 7, method 700 may be performed within a DSP, microcontroller or other portion of a radio tuner. While this method for performing detection can be executed regularly, in some implementations, the method can be executed responsive to a user (or system) request for a channel seek operation, e.g., to determine the presence of one or more valid signals at a location of a receiver. As seen, method 700 may begin by removing an analog FM carrier from an incoming signal (block 710). As discussed above a band stop filter may remove the analog channel information from a decimated band limited signal, leaving only the digital sideband channel information. This incoming signal may then be applied to a filter that is matched to a pulse shaping function (block 720). Namely, this filter may be matched to the pulse shaping function used to generate the OFDM symbols. In one embodiment, as discussed below, this filter may be a matched filter approximation.

Still referring to FIG. 7, peaks may be detected (block 730). More specifically, for a sampling window that corresponds to a predetermined number of OFDM symbols peaks in the filter output may be detected. For each detected peak, a time index may be stored (block 740). For example, a buffer may include a plurality of entries, and for each validly detected peak, a time index may be stored in a corresponding entry of the buffer. This time index may correspond to a length of time from the beginning of the sampling window to the detected peak. Next, after the sampling window has completed and any validly detected peaks have had time indices stored for them, control passes to block 750. At block 750, the time indices may be differentiated to obtain pulse periods. That is, for each pair of adjacent peaks, the length of time between the peaks may be determined by this differentiation.

Then a loop may be performed beginning at block 755. For each pulse period, various operations may be performed. First, at diamond 760 it may be determined if the pulse period is within a predetermined range of the symbol period. That is, for an OFDM system having an OFDM symbol period of approximately 2.9 milliseconds, it may be determined whether the given pulse period is within predetermined range of this symbol period. If so, control passes to block 770, where a counter may be incremented. In either event, control passes back to block 755 for operations for a next pulse period.

When all such pulse periods within the sampling window have been processed, control passes next to diamond 780 where it may be determined whether the counter value is greater than another threshold. Namely, this threshold may correspond to a percentage of the number of expected OFDM symbols to be received within the sampling window. If the counter value is greater than this threshold, control passes to block 795, where an HD™ signal is detected. Accordingly, various control operations may be performed to ready the system for digital audio. For example, a signal may be sent to the HD™ modulator to initiate a power up sequence. Furthermore, a signal may be sent to the analog front end to enable it for wider bandwidth operation, e.g., via control of one or more programmable filters. Still further, a blending control signal may be generated to initiate a blending operation when HD demodulation begins. Otherwise if no valid digital radio signal is detected, control passes to block 790, where no HD™ signal is detected. While shown with this particular implementation in the embodiment of FIG. 7, understand the scope of the present invention is not limited in this regard. For example, this detection method may be run on a regular interval when there is no valid HD™ signal detected, upon a scan operation for scanning a radio spectrum, or when tuning to a selected channel.

Figure 8:
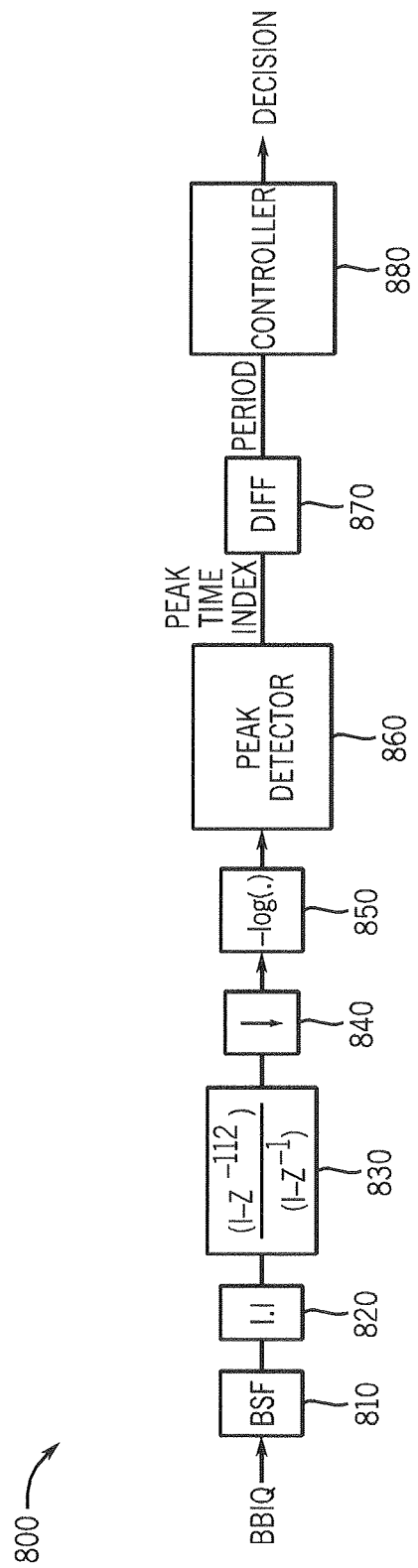
FIG. 8 is a block diagram of a detection circuit in accordance with an embodiment of the present invention.

Referring now to FIG. 8, shown is one embodiment of a detection circuit 800, which may be part of a DSP or other processor. As seen, incoming band limited signals may be provided to detection circuit 800. As shown in FIG. 8, such signals may be band limited complex signals, namely IQ signals, which may be received at a rate of 744.1875 kHz, in one embodiment. The incoming signals are provided to a filter 810 which may be a band stop filter to remove the analog signal information, leaving only the digital sidebands. In one embodiment, this band stop filter may be a finite impulse response (FIR) filter, although the scope of the present invention is not limited in this regard.

Still referring to FIG. 8, the filtered signals may be provided to a magnitude generator 820, which may take a magnitude of the complex signals, as phase information is not needed for processing of digital radio. The output signal from magnitude generator 820 may be provided to another filter 830. Namely, filter 830 may be a matched filter that acts as an approximation of the pulse shaping function used to generate the transmitted digital radio signal at a transmitter location (e.g., of a radio broadcaster). While the scope of the present invention is not limited in this regard, filter 830 may have a function corresponding to $(1-Z^{-112})/(1-Z^{-1})$, where $Z^{-112}$ is a far away sample and $Z^{-1}$ is a close delayed sample (e.g., a previous sample). Thus filter 830 may act to generate an output having peaks that correspond to edges of symbols (when such symbols are present), which can be an indication of detection of a valid digital radio signal.

Still referring to FIG. 8, the filtered output may be provided to a decimator 840 which in one embodiment may perform a decimation by 32, to reduce the sampling rate such that processing cycles can be saved, reducing complexity and power consumption. The decimated signals may be provided to a logarithmic generator 850, in embodiments in which such a logarithm analysis may be desired. The output of log generator (where present) may be provided to a peak detector 860. In general, peak detector 860 may operate to detect, during a sampling window that corresponds to a plurality of symbol periods, each peak during a given symbol period. Also, peak detector 860 may operate to generate an index corresponding to the time at which a peak is detected, with reference to the beginning of a sampling window. In one embodiment, peak detector 860 may include or may be associated with a storage or buffer such that when a peak is detected, the corresponding time index for the detected peak may be stored.

Such peak time indices may be provided to a differentiator 870. Differentiator 870 may operate to generate pulse period information for each pair of the adjacent peaks detected. Accordingly, differentiator 870 may output a number of pulse period values, each corresponding to the difference between two adjacent peaks. As seen, this information may be provided to a controller 880 which may include, in various embodiments one or more counters, a comparator and other such logic. In general, controller 880 may in essence build a histogram and determine whether a number of the differentiated periods corresponding to an OFDM symbol is greater than a threshold based on the histogram level at the bin corresponding to the OFDM symbol period. If so, a valid digital radio signal is determined and detected, otherwise no such indication occurs.

More specifically, in one embodiment, controller 880 may operate to increment a counter for each pulse period value that is within a threshold amount of the OFDM symbol period. At the conclusion of the sampling window, if a value of this counter equals at least a predetermined threshold count value, a valid digital radio signal detection occurs. Otherwise it does not. While shown with this particular implementation in the embodiment of FIG. 8, understand that the scope of the present invention is not limited in this regard.

Figure 9:
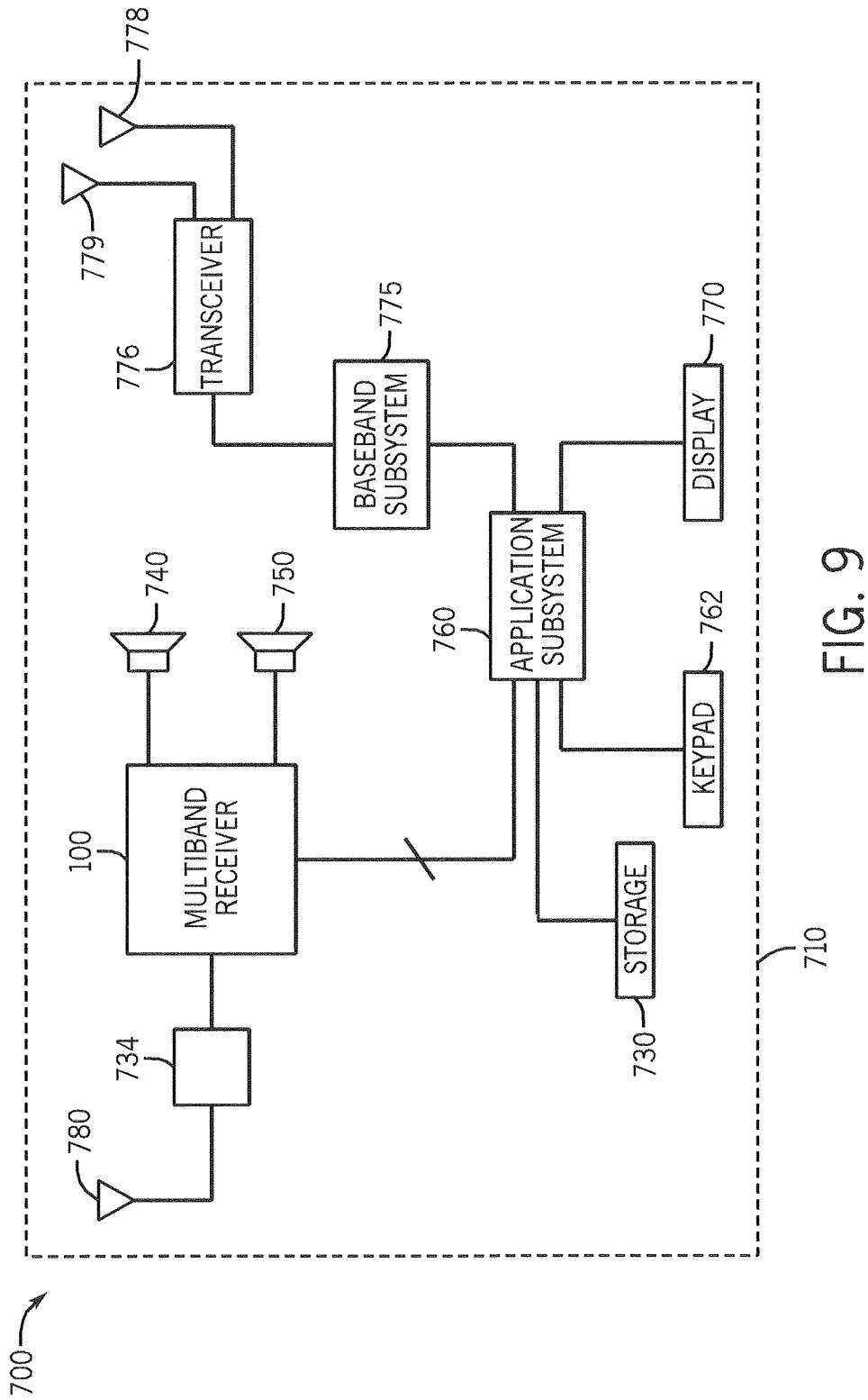
FIG. 9 is a block diagram of a system in accordance with an embodiment of the present invention.

Referring to FIG. 9, in accordance with some embodiments of the invention, a multiband receiver 100, which may include an HD™ demodulator and a separate detection circuit in accordance with an embodiment, may be part of a multimedia portable wireless device 710, which in turn is part of a wireless system 700. As examples, the wireless device 710 may be a multi-function, multi-band radio, cellular telephone, smart phone, PDA, tablet computer, mobile game device, or so forth and may play music or book downloads, and may be part of a wireless link between a satellite antenna and a radio receiver, a terrestrial receiver, etc.

Among its other various functions, the wireless device 710 may store digital content on a storage 730, which may be a flash memory or hard disk drive, as a few examples. The wireless device 710 generally includes an application subsystem 760 that may, for example, receive input from a keypad 762 of the wireless device 710 (which may be a touch pad, e.g., of a display 770) and display information on display 770, such as a HD™ presence indicator based on a detection as described above. Furthermore, the application subsystem 760 may generally control the retrieval and storage of content from the storage 730 and the communication of, e.g., audio from receiver 100. As shown, receiver 100 may be directly connected to speakers 740 and 750 for output of audio data (understand that in some embodiments a separate audio processor may be integrated between the receiver and speakers). As depicted in FIG. 9, the multimode receiver 100 may be coupled by a matching network 734 to a receiver antenna 780.

In accordance with some embodiments of the invention, the wireless device 710 may have the ability to communicate over a communications network, such as a wide area, local area, or personal wireless network. For these embodiments, the wireless device 710 may include a baseband subsystem 775 that is coupled to the application subsystem 760 for purposes of encoding and decoding signals for this wireless network. Baseband subsystem 770 may be coupled to a transceiver 776 that is connected to corresponding transmit and receive antennas 778 and 779.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a filter to receive a band limited signal downconverted from a radio signal and to filter the band limited signal according to a pulse shaping function used to encode the radio signal;
a peak detector to detect peaks within the filter output;
a differentiator coupled to the peak detector to determine a pulse period for each of a plurality of pairs of the detected peaks; and
a controller to detect presence of a valid signal within the radio signal based at least in part on the detected peaks, wherein the controller is to determine a number of the plurality of pairs having a pulse period within a threshold range of a symbol period used in encoding the radio signal.

2. The apparatus of claim 1, wherein the controller is to detect the presence if the number of the plurality of pairs within the threshold range during a sampling window is greater than a threshold.

3. The apparatus of claim 1, wherein the apparatus comprises a digital signal processor (DSP) of a radio receiver, and based on the detected presence, the DSP is to send an enable signal to a digital radio demodulator coupled to the DSP to perform digital demodulation on the band limited signal to obtain a first demodulated signal corresponding to the radio signal.

4. The apparatus of claim 3, wherein the DSP further includes an analog demodulator to demodulate the band limited signal to obtain a second demodulated signal corresponding to an analog channel within the radio signal.

5. The apparatus of claim 4, further comprising a blending circuit to blend the first and second demodulated signals into a blended demodulated signal and to output the blended demodulated signal as a digital stream.

6. A method comprising:
applying an incoming band limited signal to a filter matched to a pulse shaping function used to encode a digital signal into a radio signal according to a digital radio communication scheme;
during a sampling window, detecting one or more peaks in the filter output;
determining presence of a valid digital signal in the radio signal based at least in part on the one or more detected peaks;
storing a time index for each of the one or more detected peaks in a storage;
differentiating pairs of the detected peaks based on the time index for each of the corresponding detected peaks;
determining a pulse period for each of the differentiated pairs of the detected peaks; and
determining, for each of the pulse periods, whether the corresponding pulse period is within a predetermined range of a symbol period of the digital radio communication scheme.

7. The method of claim 6, further comprising incrementing a counter for each pulse period determined to be within the predetermined range.

8. The method of claim 7, further comprising detecting presence of a valid digital signal if a value of the counter is greater than a second predetermined threshold.

9. The method of claim 8, further comprising detecting the presence while a demodulator used to demodulate the digital signal is powered down.

10. A system comprising:
an antenna to receive a radio signal;
a tuner coupled to the antenna to process the radio signal, the tuner comprising:
an analog front end to receive the radio signal and to downconvert the radio signal to a second frequency signal;
a digitizer to digitize the second frequency signal;
a digital signal processor (DSP) coupled to the digitizer to receive the digitized signal, the DSP including:
a filter to receive the digitized signal and to filter the digitized signal according to a pulse shaping function used to encode the radio signal;
a peak detector to detect peaks within the filter output;
a differentiator coupled to the peak detector to determine a pulse period for each of a plurality of pairs of the detected peaks; and
a controller to detect presence of a valid signal within the radio signal based at least in part on the detected peaks, wherein the controller is to determine a number of the plurality of pairs having a pulse period within a threshold range of a symbol period used in encoding the radio signal and to detect the presence if the number of the plurality of pairs within the threshold range during a sampling window is greater than a threshold.

11. The system of claim 10, wherein based on the detected presence, the DSP is to send an enable signal to a digital radio demodulator coupled to the DSP to perform digital demodulation on the digitized signal to obtain a first demodulated signal corresponding to the radio signal, and wherein the DSP further includes an analog demodulator to demodulate the digitized signal to obtain a second demodulated signal corresponding to an analog channel within the radio signal.

* * * * *